Patented Sept. 18, 1934

1,973,692

UNITED STATES PATENT OFFICE 1,973,692

PARAFFIN EMULSION AND THE LIKE AND PROCESS OF MAKING THE SAME

Hubert L. Becher, Trenton, N. J., assignor, by mesne assignments, to Bennett, Incorporated, Cambridge, Mass., a corporation of Massachusetts No Drawing. Application October 30, 1928, Serial No. 316,109

14 Claims. (Cl. 134—1)

My invention relates to a new paraffin emulsion or dispersion and the like and to the process of making the same. This emulsion is useful in the manufacture of molded pulp board, cardboard and paper. Paraffin has heretofore been emulsified or dispersed in water with the aid of an emulsifying agent such as a resin soap or soap prepared from palmitic or stearic acid. I have found that a better and more stable emulsion of paraffin may be produced by the use of a soap made of Montan wax. An emulsion thus produced will retain its stability even in the presence of very large amounts of water. Pulp board, cardboard or paper sized with this emulsion is very highly waterproof.

My preferred method of preparing the emulsion is to add from 20%–25% or more, by weight, of Montan wax to paraffin and then to add to the mixture an alkali, for instance, caustic soda, for saponifying the Montan wax, in quantities sufficient to effect as complete a saponification of such wax as its nature will permit. The paraffin and the Montan wax are first melted in hot water and thoroughly agitated therein until they are broken up as finely as possible, the alkali is then added and the stirring is continued until substantially all the saponification has taken place and the paraffin has been thoroughly emulsified. The emulsion is then cooled with continued agitation until the paraffin has become hard. The amount of water used in this process should be sufficient to permit the formation of a proper emulsion but not much more than this amount. The mixture should be stirred at all times, stirring being particularly advisable during the cooling stage in order that the character of the emulsion may not be destroyed by agglomeration and settling of the waxes.

*Example.*—100 pounds of Montan wax and 300 pounds of paraffin are placed into 900–1000 pounds of water heated sufficiently to melt both waxes, and then thoroughly stirred. After the waxes have been broken up into fine particles, 7 pounds of caustic soda in solution, which forms with the water a caustic soda solution of about 0.8% to 0.7% strength, i. e., approximately 0.75% strength, are added gradually and the heating and stirring are continued for 10–15 minutes after the addition of the caustic soda has been completed. The emulsion is then complete. In order to offset the increase in viscosity produced by the subsequent cooling, about 600–700 pounds of water sufficiently hot to prevent chilling of the waxes are added and the emulsion is then allowed to cool below the melting points of the waxes and thus assume the form of a paste.

Instead of diluting with hot water prior to cooling, I may permit the emulsion to cool and during the cooling stage add cold water slowly, so as to dilute the cooling emulsion gradually, about in proportion to what would otherwise be the increase of its viscosity, and without suddenly chilling it. I may also, instead of diluting the emulsion with either hot water or cold water, pass it through a colloid mill suitably cooled, thus effecting the same result.

If any paraffin should work its way up to the surface after the emulsion has been allowed to stand, slight agitation will easily restore homogeneity.

The emulsion may be used either by mixing the same directly with the paper pulp or by first converting it into an extremely fine suspension by double decomposition with a metallic salt, for instance, magnesium sulfate or aluminum sulfate, thus rendering unnecessary the subsequent addition of a precipitant in the beater, the paraffin and the metallic salts of the saponified Montan wax being so finely divided that the precipitant may be added at so early a stage of the fibre treating process. The suspension moreover lends itself more readily to prolonged storing, and does not "cream" as readily as the emulsion.

My emulsion or suspension is of particular advantage in the manufacture of molded pulp board, such as is usually made by running paper pulp, wood pulp or the like into a mold and by means of pressure removing the majority of the water (see, for instance, United States Letters Patent No. 971,936 dated October 4, 1910 and No. 1,272,566 dated July 16, 1918) and subsequently drying out the remainder of the water by the application of heat. The emulsion or suspension is preferably added to the fibre while the latter is being beaten up in the beater. A board thus produced is very highly waterproof and highly dielectric. The proportion of the combined waxes present in the emulsion or suspension to the weight of the fibre in the final product may vary within wide limits but is preferably from 1–5% or approximately from ¼ to 1 part of Montan wax and from 1 to 4 parts of paraffin to 100 parts of fibre, dry weight. The board is of particular value for use as an interior or exterior lining for buildings.

As Montan wax for some reason apparently not definitely known, is not completely saponifiable, the metallic salts of the saponified Montan wax hereinabove referred to will contain a substantial admixture of an unsaponified ingredient or portion of the Montan wax so that only a portion, although a substantial one, of the Montan wax is present in the completed board in the form of a metallic salt of Montan wax. None of the Montan wax will be present in the form of saponified Montan wax because if the emulsion is added in the beater a precipitant (for instance, magnesium sulfate or aluminum sulfate) will have to be added in the manner and for the reasons well known in the art to form the suspension, i. e. to precipitate the paraffin and to convert the soluble alkali metallic salt of Montan wax into an insoluble metallic salt of Montan wax. The metallic salt of the alkali metal (f. i. sodium sulfate) formed by the double decomposition referred to, being soluble in water, is substantially all washed out with the drainage water, only a negligible portion remaining in the board because held in solution in the water which is not pressed out but is driven off by the subsequent heat treatment.

As hereinbefore indicated, a good deal of the Montan wax is present in unsaponified condition in the finished aqueous dispersion or emulsion, on account of its inherently inert or unsaponifiable nature. So, too, it should be mentioned that, inasmuch as paraffin wax is a substantially inert thermoplastic hydrocarbon, it undergoes practically no change whatever during the dispersing operation, and hence appears as such in the finished aqueous dispersion. The surprising thing about my finished aqueous dispersion is its extraordinary stability, even when subjected to considerable dilution, as hereinbefore described, and despite the fact that the only stabilizing ingredient present therein is the saponified portion of the Montan wax and the further fact that the Montan wax is used in amount distinctly subordinate to that of the inert thermoplastic hydrocarbon, namely, the paraffin wax. To these facts is doubtless traceable the ability of the dispersion to impart high waterproof and dielectric qualities to paper or board in which the dispersion is used as a sizing ingredient, as hereinbefore described.

The emulsion or suspension may be used also in connection with the manufacture of waterproof paper or waterproof cardboard, either by beating it up with the fibre in the beater or by forming a surface coating on paper or cardboard.

When in my claims I speak of an emulsion, I intend to include in this term the suspension produced by adding a precipitant to the emulsion.

I have already adverted to the ability of the aqueous wax emulsions or dispersions produced according to my invention to render papers or boards sized therewith very highly waterproof and highly dielectric. This ability arises from the particular ingredients which enter as raw materials into the preparation of my dispersions and the end results of the reaction which they undergo during the dispersing operation. In this connection, it is to be noted that the practice of my invention gives rise to dispersions wherein the sole stabilizing agent is the saponified portion of the Montan wax. In other words, no water-absorbing or hydrophilic colloid enters as the protective or stabilizing agent into the preparation of the dispersion, the resulting dispersion owing its high degree of stability merely to the small quantity of soap generated in situ as a result of the reaction between the saponifiable portion of the Montan wax and the caustic soda solution. Aside from the fact that Montan wax is substantially inert thermoplastic hydrocarbon material associated with only a limited portion of saponifiable material, it is again to be observed that I may use, as in the example hereinbefore given, a decidedly subordinate proportion of Montan wax along with the paraffin wax or other other inert thermoplastic hydrocarbon in producing the dispersions of my invention. It will thus be seen that it is only the exceedingly small amount of Montan wax soap present as protective colloid in my dispersions that gives them their excellent stability and that the absence of extraneous water-absorbing colloids therein makes for markedly greater water repellance in papers, boards, or other articles containing the dried residue of the dispersion as a sizing of impregnating medium.

I claim:

1. An emulsion of a mixture of substantially unsaponifiable, aliphatic thermoplastic hydrocarbon and Montan wax in water containing practically only said saponifiable portion of the Montan wax saponified with non-hydrophilic, non-stabilizing alkali as the stabilizer of said emulsion.

2. A dispersion of a mixture of substantially unsaponifiable, aliphatic thermoplastic hydrocarbon and a subordinate proportion of Montan wax in water containing practically only said saponifiable portion of the Montan wax saponified with non-hydrophilic, non-stabilizing alkali as the stabilizer of said dispersion.

3. A dispersion of a mixture of paraffin wax and a decidedly subordinate proportion of Montan wax in water containing substantially only said saponifiable portion of the Montan wax saponified with non-hydrophilic, non-stabilizing alkali as the stabilizer of said dispersion.

4. A dispersion of a mixture of substantially unsaponifiable, aliphatic thermoplastic hydrocarbon and Montan wax, said Montan wax amounting to not more than about 25% by weight of the mixture, in water containing practically only said saponifiable portion of the Montan wax saponified with non-hydrophilic, non-stabilizing alkali as the stabilizer of said dispersion.

5. A dispersion of a mixture of paraffin wax and Montan wax, said Montan wax amounting to not more than about 25% by weight of the mixture, in water containing substantially only said saponifiable portion of the Montan wax saponified with non-hydrophilic, non-stabilizing alkali as the stabilizer of said dispersion.

6. A process of preparing an aqueous emulsion of substantially unsaponifiable, aliphatic thermoplastic hydrocarbon, which comprises emulsifying in water a mixture of melted, substantially unsaponifiable aliphatic thermoplastic hydrocarbon and melted Montan wax with the saponifiable portion of said latter melted ingredient saponified by a non-hydrophilic, non-stabilizing alkali so as to constitute substantially the only stabilizing agent for the resulting emulsion.

7. A process which comprises dispersing in water a mixture of melted, substantially unsaponifiable, aliphatic thermoplastic hydrocarbon and a subordinate proportion of melted Montan wax with the saponifiable portion of said latter melted ingredient saponified by caustic soda so as to constitute substantially the only stabilizing agent for the resulting dispersion.

8. A process of making an aqueous dispersion, which comprises melting a mixture of paraffin wax and a subordinate proportion of Montan wax and adding thereto with agitation an aqueous solution of caustic soda to saponify the saponifiable portion of said Montan wax and thereby to produce an aqueous dispersion of paraffin and Montan wax wherein substantially only said saponifiable portion of Montan wax serves as the stabilizing agent.

9. A process of making an aqueous emulsion of a substantially unsaponifiable, aliphatic thermoplastic hydrocarbon, which comprises melting a mixture of substantially unsaponifiable, aliphatic thermoplastic hydrocarbon and Montan wax and mixing therewith an aqueous solution of sufficient non-hydrophilic, non-stabilizing alkali to saponify practically all of the saponifiable portion of said Montan wax and thereby to produce an aqueous emulsion of said thermoplastic hydrocarbon and Montan wax wherein substantially only said saponified portion of Montan wax serves as the stabilizing agent.

10. A process of making an aqueous dispersion, which comprises melting a mixture of substantially unsaponifiable, aliphatic thermoplastic hydrocarbon and a subordinate proportion of Montan wax and mixing therewith an aqueous solution of sufficient non-hydrophilic, non-stabilizing alkali to saponify practically all of the saponifiable portion of said Montan wax and thereby to produce an aqueous dispersion of said thermoplastic hydrocarbon and Montan wax wherein substantially only said saponified portion of Montan wax serves as the stabilizing agent.

11. A process of making an aqueous dispersion, which comprises melting a mixture of substantially unsaponifiable, aliphatic thermoplastic hydrocarbon and up to about 25% by weight of Montan wax, based on said hydrocarbon, and mixing therewith an aqueous solution of sufficient caustic soda to saponify practically all of the saponifiable portion of said Montan wax and thereby to produce an aqueous dispersion of said thermoplastic hydrocarbon and Montan wax wherein substantially only said saponified portion of Montan wax serves as the stabilizing agent.

12. A process of making an aqueous emulsion of substantially unsaponifiable, aliphatic thermoplastic hydrocarbon, which comprises melting a mixture of substantially unsaponifiable, aliphatic thermoplastic hydrocarbon and Montan wax and mixing therewith a caustic soda solution of approximately 0.75% strength to saponify the saponifiable portion of said Montan wax and thereby to produce an aqueous emulsion of said thermoplastic hydrocarbon and Montan wax wherein substantially only said saponified portion of Montan wax serves as the stabilizing agent.

13. An emulsion of a mixture of paraffin wax and Montan wax in water, saponifiable portion of said Montan wax being saponified with a non-hydrophilic, non-stabilizing alkali and constituting substantially the only stabilizing ingredient of said emulsion.

14. A process of making an aqueous emulsion of paraffin wax, which comprises melting a mixture of paraffin wax and Montan wax and adding thereto with agitation an aqueous solution of a non-hydrophilic, non-stabilizing alkali to saponify saponifiable portion of said Montan wax and thereby to produce an aqueous emulsion of paraffin wax and Montan wax wherein substantially only said saponified portion of Montan wax serves as the stabilizer.

HUBERT L. BECHER.